C. A. CLAFLIN.
HOSE COUPLING.
APPLICATION FILED OCT. 19, 1912.
1,204,650.
Patented Nov. 14, 1916.
2 SHEETS—SHEET 2.
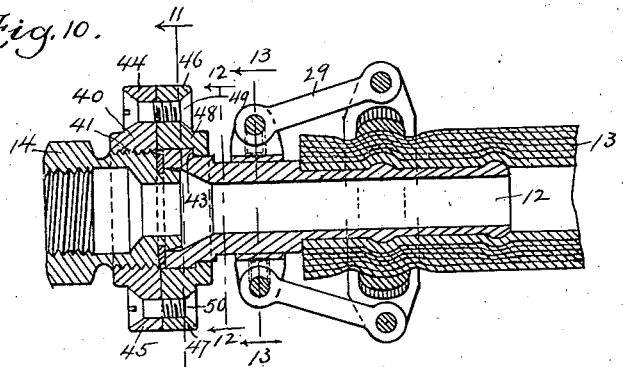
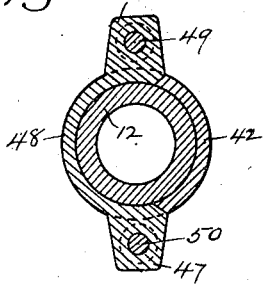
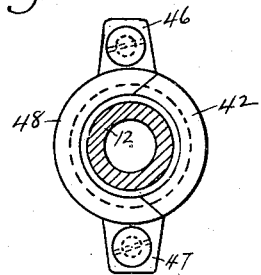
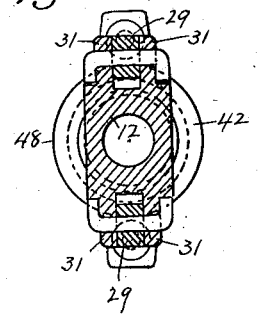
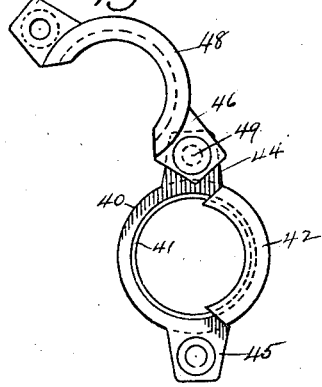
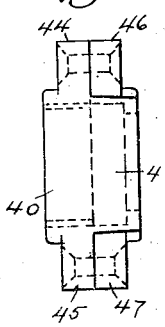
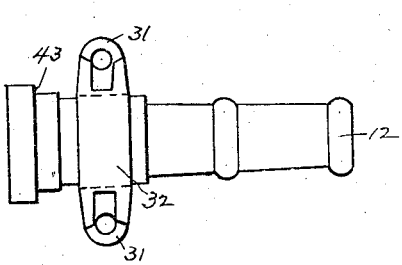
Witnesses:
Inventor:
C. A. Claflin
Attys.

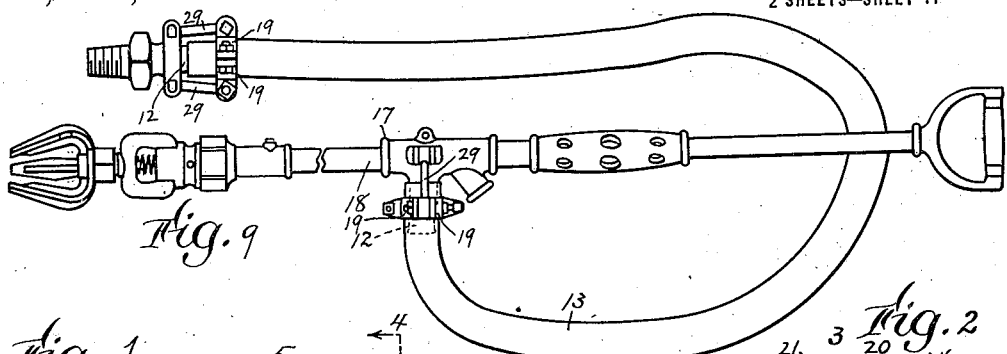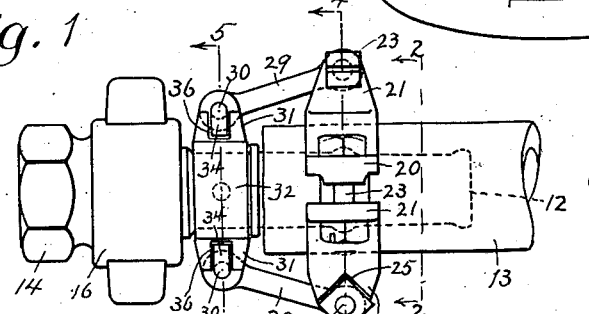

UNITED STATES PATENT OFFICE.

CHARLES A. CLAFLIN, OF MEDFORD, MASSACHUSETTS.

HOSE-COUPLING.

1,204,650.　　　　　Specification of Letters Patent.　　Patented Nov. 14, 1916.

Application filed October 19, 1912. Serial No. 726,763.

*To all whom it may concern:*

Be it known that I, CHARLES A. CLAFLIN, a citizen of the United States, residing at Medford, in the county of Middlesex and State of Massachusetts, have invented certain new and useful Improvements in Hose-Couplings, of which the following is a specification.

This invention has for its object to provide an improved means for securely clamping an end of a length of flexible hose to a metallic nipple or conduit portion inserted in the hose.

The invention consists in the improvements which I will now proceed to describe and claim.

Of the accompanying drawings forming a part of this specification, Figure 1 represents a side view of a hose coupling embodying my invention. Fig. 2 represents a section on line 2—2 of Fig. 1, and an elevation of the parts at the left of said line. Fig. 3 represents a longitudinal section of the coupling. Fig. 4 represents a section on line 4—4 of Fig. 1, the hose being omitted. Fig. 5 represents a section on line 5—5 of Fig. 1. Fig. 6 represents a section on line 6—6 of Fig. 2. Fig. 7 represents a side view showing my improved coupling applied to an angular conduit. Fig. 8 represents a section on line 8—8 of Fig. 7. Fig. 9 represents a side view of a boiler tube cleaner provided with couplings embodying the invention. Fig. 10 represents a view similar to Fig. 3, showing a different form of coupling nut or union for connecting the nipple with the body of the conduit. Fig. 11 represents a section on line 11—11 of Fig. 10. Fig. 12 represents a section on line 12—12 of Fig. 10. Fig. 13 represents a section on line 13—13 of Fig. 10. Fig. 14 represents a side view of the nipple detached. Fig. 15 represents an edge view of the coupling nut shown by Figs. 10, 11 and 12. Fig. 16 represents a side view, showing the coupling nut opened.

The same reference characters indicate the same parts in all of the figures.

In the drawings, 12 represents a tubular nipple forming a part of a conduit section and formed at one end to enter a length of flexible hose or tubing 13, the opposite end being provided with means for engagement with another conduit section. In the construction shown by Fig. 3, the nipple forming a part of a straight conduit, an internally-threaded fitting 14 is connected with the nipple by a coupling nut or union 16. In the construction shown by Fig. 7 the nipple forms a part of an angular conduit, which includes a branch 17 internally threaded to receive an externally threaded conduit section 18.

Surrounding the hose 13 and a portion of the nipple inserted therein is an adjustable annular clamp composed of a plurality of sections, preferably four as shown each of which has a curved body portion 19, approximately radial ears 20 and 21 at opposite ends of the body portion, and a curved extension 22 or clamp member at one end of the body portion. The outer surface of each clamp member 22 is in sliding contact with the inner surface of the body portion 19 of the adjacent section, as shown by Fig. 4, the body portion of each section overlapping the clamp member of the next section so that the members 22 collectively form a nearly continuous annular clamp, adapted to be contracted upon the hose 13, the number and length of said clamp members 22 being such that they bear on and are adapted to compress a nearly complete or continuous zone of the hose. In practice I provide four clamp sections and clamp members 22, the four members 22 being formed and relatively arranged to constitute a nearly continuous circular clamp bearing on the periphery of the hose, and compressing the same with substantial uniformity throughout all parts of the zone on which the clamp acts, instead of compressing the hose mainly at two diametrically opposite points as heretofore.

The ear 21 of each section is adjustably connected with the ear 20 of the next section by means of a bolt 23, having a head at one end and screw-threaded at the other end, to engage a nut 24, the bolts being thus adapted to contract and permit the expansion of the clamp. The tightening of the nuts causes a radial inward movement of the rigid body portions 19 and an inward flexure of the curved flexible extensions or clamp members 22. The nuts 24 are preferably engaged with notches or recesses 25 bine to present as accurately as possible a circular form in order that they may uniformly clamp a substantially continuous zone of the hose. The ends of the links 29 extend between the ears of some of the clamp sections, and constitute stop members limiting the approach of said ears toward each other. The other ears, not engaged with the links, are provided with stop members or projections 50, preferably formed on the end ears as shown. The stop members formed by said links and projections are so formed that, when the clamp is fully contracted, it assumes a substantially circular form and uniformly compresses all parts of said zone. In other words, the clamp cannot assume an elliptical form when fully contracted, so that the compressed zone of the hose cannot be excessively compressed at a given portion or portions, and inadequately compressed at another portion or portions, as might be the case if it were possible to tighten or turn home the nut 24 on any bolt farther than the nut or nuts on any other bolt or bolts.

By referring to Fig. 3 it will be seen that the length of the links 29 is such that the clamp sections 19 will always be retained opposite the rib 26 of the nipple so as to coact properly with said rib in securing the hose.

It will be seen that the clamp sections are arranged in pairs, one pair comprising the two sections connected with one of the links 29, while the other pair comprises the sections connected with the other link 29. The two links therefore confine all the sections of the clamp against lateral displacement. The clamp is flexibly connected with the links by the bolts 23 which pass through the links, instead of being rigidly connected with the links as heretofore, so that the clamp is adapted to expand and contract and conform to hose of different diameters without deviation of its sections from a plane at right angles to the longitudinal axis of the nipple and hose.

I claim:—

1. A hose coupling comprising a nipple adapted to enter one end of a flexible hose, four segmental clamp sections formed to collectively surround the nipple and a hose thereon, each section including a rigid body portion with an eccentric inner surface and a flexible curved extension at one end thereof adapted to be forced inwardly by the eccentric surface of the adjacent section, said flexible portions being relatively arranged to collectively constitute a practically continuous contractible clamp which assumes a circular, non-elliptical form when fully contracted and is adapted to embrace a substantially continuous zone of the hose, each section having an end ear located at one end of its body portion and an intermediate ear at the opposite end of the body portion and located between said end ear and the flexible extension, and four clamp-adjusting bolts connecting the end and intermediate ears of the sections in pairs and adapted to draw the ears of each pair toward each other and contract the clamp, by radial inward movement of the said rigid body portions and flexure of said flexible extensions, means being provided for loosely connecting the clamp with the nipple to prevent edgewise displacement of the clamp.

2. A hose coupling comprising a nipple adapted to enter one end of a flexible hose, four segmental clamp sections formed to collectively surround the nipple and a hose thereon, each section including a rigid body portion with an eccentric inner surface and a flexible curved extension at one end thereof adapted to be forced inwardly by the eccentric surface of the adjacent section, said flexible portions collectively constituting a contractible clamp embracing a substantially continuous zone of the hose, each section having an end ear located at one end of its body portion and an intermediate ear at the opposite end of the body portion and located between said end ear and the flexible extension, four clamp-adjusting bolts connecting the end and intermediate ears of the sections in pairs, and adapted to draw the ears of each pair toward each other and contract the clamp, by radial inward movement of the said rigid body portions and flexure of said flexible extensions, and stop members between said end and intermediate ears adapted to uniformly limit the approach of the ears toward each other and prevent the clamp from assuming an elliptical form when fully contracted, means being provided for loosely connecting the clamp with the nipple to prevent edgewise displacement of the clamp.

3. A hose coupling comprising a nipple adapted to enter one end of a flexible hose, segmental clamp sections formed to collectively surround the nipple and a hose thereon, each section including a rigid body portion with an eccentric inner surface and a flexible curved extension at one end thereof adapted to be forced inwardly by the eccentric surface of the adjacent section, said flexible portions collectively constituting a contractible clamp embracing a substantially continuous zone of the hose, each section having an end ear located at one end of its body portion and an intermediate ear at the opposite end of the body portion and located between said end ear and the flexible extension, clamp-adjusting bolts connecting the end and intermediate ears of the sections in pairs, and adapted to draw the ears of each pair toward each other and thereby contact the clamp, the nipple being provided with oppositely projecting ears, links pivoted to said nipple ears and to two of said bolts, said links loosely connecting the clamp with the nipple, and being formed to limit the approach of the clamp ears connected by the last mentioned bolts toward each other, and stop members limiting the approach of the clamp ears connected by the other bolts toward each other, said links and stop members preventing the clamp from assuming an elliptical form when fully contracted.

In testimony whereof I have affixed my signature, in presence of two witnesses.

CHARLES A. CLAFLIN.

Witnesses:
A. M. HARRISON,
P. W. PEZZETTI.